United States Patent [19]

Shimamura

[11] Patent Number: 4,506,592
[45] Date of Patent: Mar. 26, 1985

[54] BRAKE POWER SERVO BOOSTER

[75] Inventor: Morihiko Shimamura, Saitama, Japan

[73] Assignee: Jidosha Kiki Co., Ltd., Japan

[21] Appl. No.: 552,879

[22] Filed: Nov. 17, 1983

[30] Foreign Application Priority Data

Nov. 17, 1982 [JP] Japan .................................. 57-201687

[51] Int. Cl.³ .............................................. F16J 1/10
[52] U.S. Cl. ........................................ 92/101; 92/129; 92/140; 91/369 A; 74/110
[58] Field of Search ............. 91/369 R, 369 A, 369 B, 91/377; 92/20, 29, 84, 129, 140, 101; 74/110

[56] References Cited

U.S. PATENT DOCUMENTS 2,319,231  5/1943  Hawley .................................. 92/101
3,320,861  5/1967  Johnson et al. ......................... 92/84
4,240,330  12/1980  Farr .................................. 91/369 R

FOREIGN PATENT DOCUMENTS 2069080  8/1981  United Kingdom ............. 91/369 B

Primary Examiner—Paul E. Maslousky
Attorney, Agent, or Firm—Sughrue, Mion, Zinn, Macpeak, and Seas

[57] ABSTRACT

A brake power servo booster, in which a fluid pressure difference is generated between opposite sides of a power piston, is provided with a wedge shaped member which is forced by the power piston between the wedge shaped recess of the members of an output shaft. When the wedge shaped member is forced into the recess by the piston the distance between the members of the output shaft is enlarged.

2 Claims, 7 Drawing Figures 4,506,592

BRAKE POWER SERVO BOOSTER

BACKGROUND OF THE INVENTION

The present invention relates to a brake power servo booster, and in particular to a brake power servo booster of the stroke enlarging type in which the amount of stroke of an output shaft can be enlarged more than that of an input shaft.

Various arrangements of such a stroke enlargement type brake power servo booster have been known. Such a stroke enlargement type brake power servo booster requires an enlarging mechanism for enlarging the amount of stroke of an output shaft relative to that of an input shaft, and a lock mechanism for preventing the stroke enlarged by the enlarging mechanism from decreasing especially in the full load state of the brake power servo booster. In the conventional brake power servo booster of this type, these mechanisms are separately provided and each of them is complicated so that the brake power servo booster is not only large in size but expensive. This type of brake power servo booster is disclosed in U.S. Pat. No. 4,386,554.

SUMMARY OF THE INVENTION

In view of the above, it is an object of the present invention to provide a brake power servo booster which is small in size, as well as inexpensive, by arranging the above-mentioned enlarging mechanism and lock mechanism integrally with each other and making them remarkably simple and small in size to thereby provide an inexpensive and small sized brake power servo booster.

DETAILED DESCRIPTION OF THE INVENTION

Figure 1:
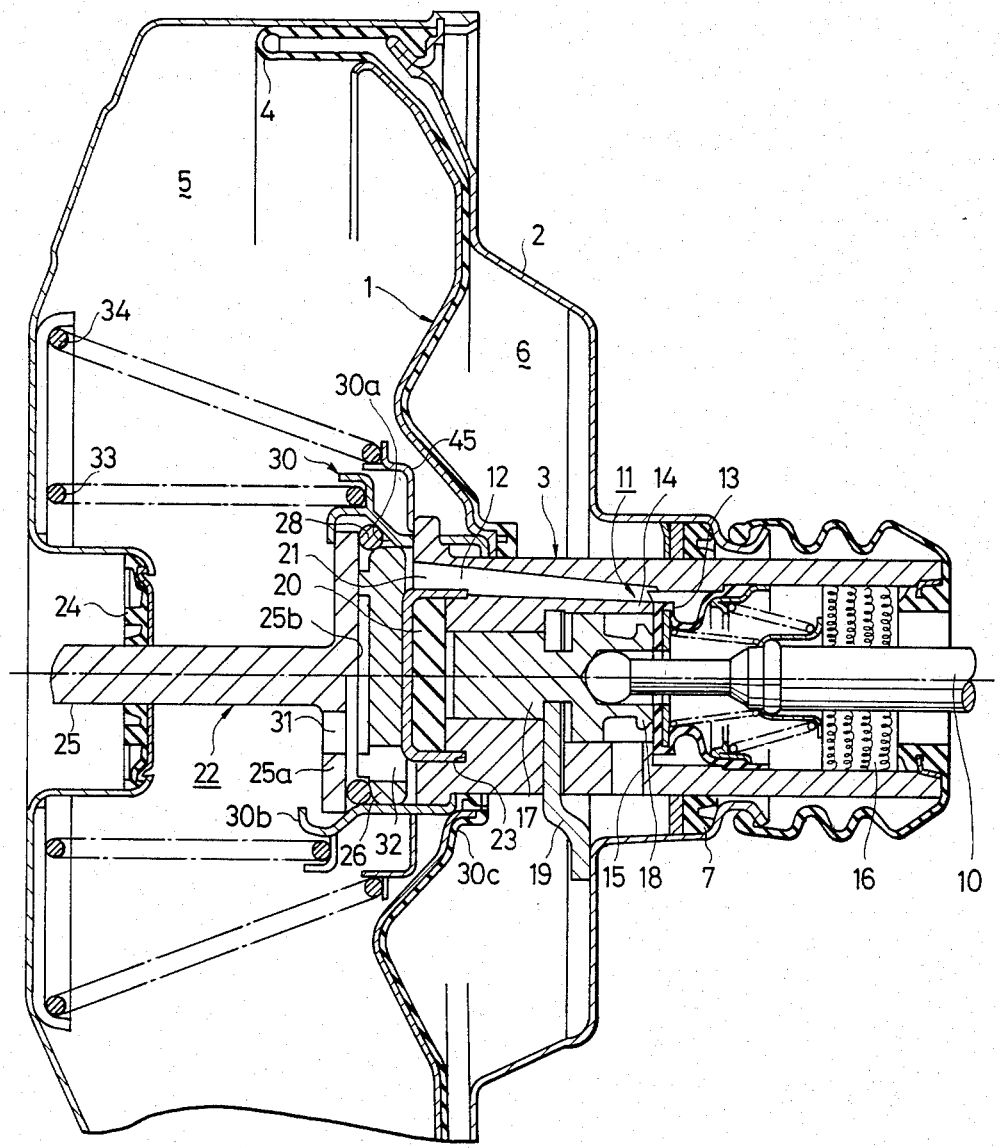
FIG. 1 is a longitudinal cross section of an embodiment according to the present invention, the upper and lower portions of the center line illustrating two actuation states different from each other.

Referring to the drawings, the present invention will be explained with respect to an embodiment thereof. In the cross section of FIG. 1, the upper part of the center line shows a non-actuated state, while the lower part of the same shows the beginning period of an actuated state. In FIG. 1, a power piston 1 is provided in a shell 2 and a valve body 3 is provided in a shaft portion of the piston 1. The inside of the shell 2 is partitioned into a constant pressure chamber 5 and a variable pressure chamber 6 by the power piston 1, the valve body 3, and a diaphragm 4. The inner periphery of the diaphragm 4 is used also as a seal member between the power piston 1 and the valve body 3. The backward end of the cylindrical valve body 3 extends out of the opening of the shell 2 while maintaining air tightness therebetween by a seal member 7.

A valve mechanism 11 which is actuatable by an input shaft 10 is contained in the valve body 3. Similarly to the conventional valve mechanism, the valve mechanism 11 is arranged such that the constant pressure chamber 5 and the variable pressure chamber 6 may be communicated with each other through a path 12 formed in the valve body 3, a gap between a valve body portion 13 and a valve seat 14 constituting the valve mechanism 11, and a path 15 formed in the valve body 3. The variable pressure chamber 6 may communicate with the atmosphere through a filter 16, a gap between the valve body portion 13 and valve seat 18 of a valve plunger 17, and the above-mentioned path 15.

The plunger 17 is prevented from coming off from the valve body 3 by a key member 19. The key member 19 is attached to the valve body 3 and is displaced in the axial direction of the valve body 3 such that the projecting end of the key member 19 contacts the inner wall of the shell 2, to thereby reduce the loss stroke at the beginning of actuation of the input shaft 10 in a manner to be described later. The key member 19 is prevented from coming off from the valve body 3 by a suitable coming-off preventing means (not shown) such as used in a known brake power servo booster having a valve mechanism of this type.

A reaction disc 20 is provided in opposition to the forward end of the valve plunger 17. The reaction disc 20 is contained in a cup-like member 21 having a bottom portion disposed on the side of an output shaft 22 and a hollow-cylindrical portion slidably inserted into an annular groove 23 formed in the valve body 3. The output shaft 22 is constituted by two members, a push rod 25 passing through a seal member 24 of the shell 2 and extending outwardly and interlocked with a piston (not shown) of a master cylinder, and a disc-like plate member 26 disposed between a base portion 25a of the push rod 25 and the bottom surface of the cup-like member 21. If the distance between the push rod 25 and the plate member 26 can be enlarged at the initial period of actuation of the brake power servo booster, the amount of stroke of the push rod 25 which constitutes the output shaft 22 may be enlarged relative to the amount of stroke of the input shaft 10.

Figure 2:
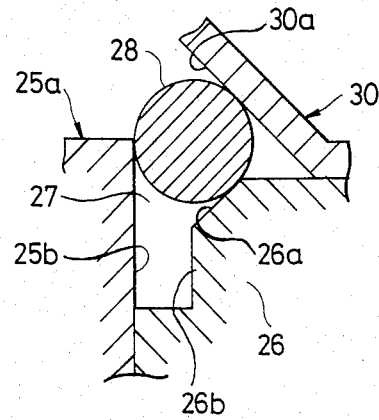
FIG. 2 is an enlarged diagram of a main part of the upper portion of FIG. 1.
Figure 4:
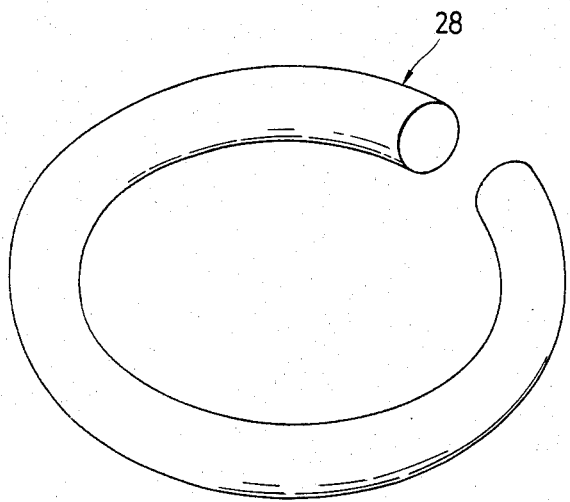
FIG. 4 is a perspective view of the wedge member 28 as shown in FIGS. 1 to 3.

In the present embodiment, as shown in the enlarged view of FIG. 2, the backward end surface of the base portion 25a of the push rod 25 is shaped into a flat surface 25b perpendicular to the axial direction of the push rod 25. The forward outer periphery of the plate member 26 is shaped into a conical surface 26a, so that a wedge-like recess portion 27 is formed between the push rod 25 and the plate member 26. A wedge member 28 is disposed at the outer periphery of the wedge-like recess portion 27 so that it can be pressed into the recess portion 27 for forcibly enlarging the distance between the push rod 25 and the plate member 26. As shown in FIG. 4, the wedge member 28 is formed of an elastic blank having a circular section and annularly curved so that the wedge member 28 maintains a diameter in its natural state which is the same or larger than that shown in FIGS. 1 and 2.

Figure 3:
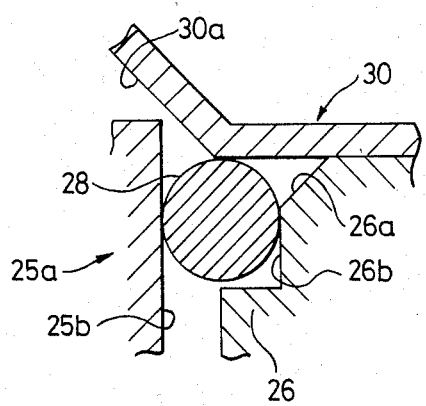
FIG. 3 is an enlarged diagram of a main part of the lower portion of FIG. 1.

The power piston which is displaced relative to the valve body 3 is integrally provided with a cylindrical member 30 containing the forward end portion of the valve body 3, the plate member 26, and the base portion 25a of the push rod 25. In the cylindrical member 30, a pushing portion 30a is formed for pressing the wedge member 28 into the wedge-like recess portion 27. The pushing member 30a is constituted by a conical surface the forward portion of which is outwardly opened so that when the power piston 1 is retracted relative to the valve body 3, the wedge member 28 is allowed to expand to the outer periphery of the wedge-like recess portion as shown in FIG. 3. When the power piston is advanced relative to the valve body 3, the wedge member 28 is pressed into the wedge-like recess portion 27 to enlarge the distance between the push rod 25 and the plate member 26. A flat surface 26b opposed to the flat surface 25b and contiguous with the conical surface 26a is formed in the plate member 26 such that, when the wedge member 28 is pressed into the wedge-like recess portion 27, the opposite ends of the wedge member 28 may be in contact with the flat surfaces 25b and 26b. In this state, the inner periphery of the cylindrical member 30 holds the outer periphery of the wedge member 28 so as to maintain the state in which the distance between the push rod 25 and the plate member 26 is enlarged.

Radially inwardly bent portions 30b and 30c respectively formed at the forward and backward end portions of the cylindrical member 30 constitute a stopper portion for restricting the amount of displacement of the power piston 1 relative to the valve body 3. A negative pressure is normally supplied to the constant pressure chamber 5 through a negative pressure inlet (not shown), and the constant pressure chamber 5 and the path 12 normally communicate with each other through a path 31 formed in the base portion 25a of the push rod 25 and a path 32 formed in the plate member 26. Further, in FIG. 1, reference numeral 33 designates a return spring for the power piston 1, 34 a return spring for the valve body 3, and 45 a retainer for transmitting the spring force of the return spring 34 to the valve body 3.

In the above-described arrangement, when the input shaft 10 is advanced from its non-actuated state to actuate the valve mechanism 11, the valve body portion 13 is seated onto the valve seat 14 to cut off the communication between the constant and variable pressure chambers 5 and 6, and at the same time the valve body portion 13 is caused to come off from the valve seat 18 so that atmospheric air is allowed into the variable pressure chamber 6. Thus, when a fluid pressure difference is generated at the opposite sides of the power piston 1, the power piston 1 is advanced against the return spring 33 relative to the output shaft 25, which receives a reaction force from a master cylinder side (not shown), and relative to the valve body 3. Then, the pushing portion 30a of the cylindrical member 30 presses the wedge member 28 into the wedge-like recess portion 27 to enlarge the distance between the push rod 25 and the plate member 26 so as to enlarge the length of the stroke of the output shaft 25 relative to that of the input shaft 10. Then, when the bent portion 30c of the backward end portion of the cylindrical member 30 comes in contact with the valve body 3 so as to be integrally coupled therewith in the operating direction, the wedge member 28 is pushed, in this state, into and between the flat surfaces 25b and 26b of the push rod 25 and the plate member 26, respectively, and is locked there. Thereafter, the power piston operates against the return springs 33 and 34 in the same manner as in an ordinary brake power servo booster.

When the depression force for the input shaft 10 is released, the input shaft 10 and the valve plunger 17 move right relative to the valve body 3 until their movement is limited by the key member 19. In this state, the valve body portion 13 is seated on the valve seat 18 so as to cut off the communication between the atmosphere and the variable pressure chamber 6. At the same time, the valve body portion 13 is retracted from the valve seat 14 by a relatively large amount so as to allow a sufficient flow path area for communication between the constant pressure chamber 5 and the variable pressure chamber 6. Thus, the pressure difference at the opposite sides of the power piston 1 decreases so that the power piston is retracted by the return springs 33 and 34, while maintaining the wedge member 28 in its state as shown in FIG. 3.

When the power piston 1 and the valve body 3 are retracted to the positions near the non-actuated positions shown in the drawing, the key member 19 first contacts the inner wall of the shell 2 so that the retraction of the key member is limited. When the valve body 3 further retreats relative to the key member 19 which has been stopped due to contact with the shell 2, it comes into contact with the key member 19 and stops. The valve body portion 13 comes close to the valve seat 14 in this state so as to reduce the loss stroke at the next advance of the input shaft 10. When the retraction of the valve body 3 is stopped, the power piston 1 is further retracted relative to the valve body 3 by the return spring 33 until it is stopped by the forward end of bent portion 30b of the cylindrical member 30 or by the fact that the diaphragm 4 comes into contact with the inner wall of the shell 2. When this state is reached, the wedge member 28 expands outwardly by its own elasticity so that the push rod 25 and the plate member 26 come into contact with each other as in the original state.

Although a flat surface 26b is formed inward of the conical surface 26a constituting the wedge-like recess portion 27 in this embodiment, it should be apparent that the flat surface 26b can be eliminated. In this case, the return spring 33 would urge the push rod 25 through the bent portion 30b of the cylindrical member 30, so that the conical surface 26a would urge the wedge member 28 radially outwardly, and therefore means such a spring or the like as an annular wire 37 shown in FIG. 5 for radially outwardly urging the wedge member ca be eliminated.

Figure 5:
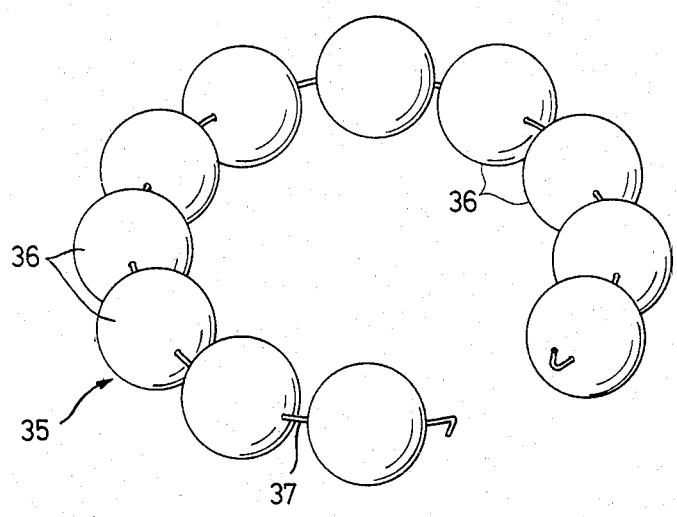
FIGS. 5 to 7 are perspective views illustrating various embodiments of the wedge member.
Figure 6:
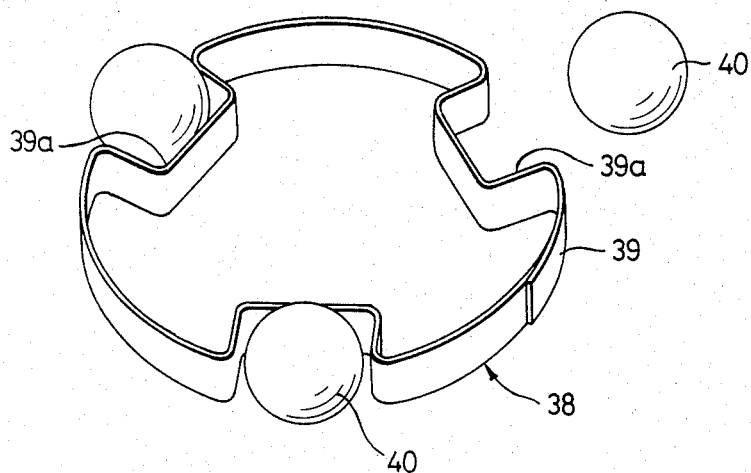
Figure 7:
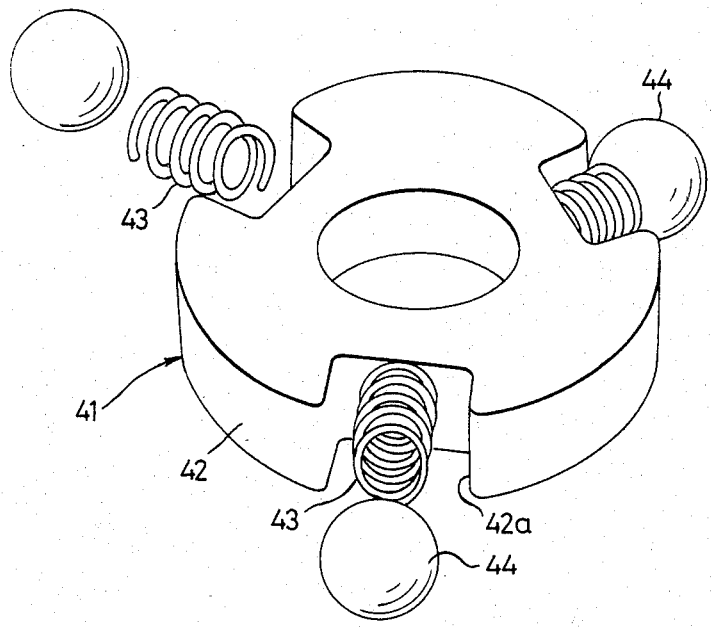

Each of FIGS. 5 to 7 shows another embodiment of the wedge member. In FIG. 5, a wedge member 35 is formed of a number of balls 36 connected by an annular wire 37. In FIG. 6, a wedge member 38 is formed of an elastic material 39 curved into a ring-shape and includes recesses 39a which are circumferentially equidistantly formed in the annular member 39 for receiving balls 40. The balls 40 received in the recesses 39a are urged outwardly by the elasticity of the annular member 39. In FIG. 7, a wedge member 41 is formed in the shape of a disc-like plate 42 with slots 42a circumferentially equidistantly formed at its outer periphery, and balls 44 are received in the slots 42a through springs 43, so that the balls 44 may be urged outwardly by the springs 42.

As described above, the brake power servo booster according to the present invention is effective and advantageous in that the arrangement thereof is very simple in comparison with the conventional booster because an output shaft is formed of at least two members and a wedge-like recess portion is formed between the two members so that a wedge member may be pressed into the wedge-like recess portion by a power piston to thereby enlarge the gap.

I claim:
1. A brake power servo booster in which a fluid pressure difference is generated between opposite sides of a power piston so as to cause said power piston to advance by said pressure difference, wherein the advanc- ing force is transmitted to an output shaft, wherein said output shaft comprises at least two members with a wedge-shaped recess formed between said at least two members and a wedge member is pressed into said wedge-shaped recess by said power piston when said power piston is caused to advance, thereby causing the distance between said at least two members to be enlarged;
  wherein said wedge member comprises an annular elastic member having a plurality of circumferentially equidistant recesses formed at its outer peripheral surface, and a plurality of balls located in respective ones of said recesses.

2. A brake power servo booster in which a fluid pressure difference is generated between opposite sides of a power piston so as to cause said power piston to advance by said pressure difference, wherein the advancing force is transmitted to an output shaft, wherein said output shaft comprises at least two members with a wedge-shaped recess formed between said at least two members and a wedge member is pressed into said wedge-shaped recess by said power piston when said power piston is caused to advance, thereby causing the distance between said at least two members to be enlarged;
  wherein said at least two members comprise a first member secured to said output shaft for movement therewith and a second member movable with respect to said output shaft, said power piston including a portion movable with respect to both of said first and second members and having an inclined surface which, upon advancement of said power piston, urges said wedge member into said recess; and
  wherein said wedge member comprises an annular elastic member having a plurality of circumferentially equidistant recesses formed at its outer peripheral surface, and a plurality of balls located in respective ones of said recesses.

* * * * *